(12) United States Patent
Tatara

(10) Patent No.: US 11,999,295 B2
(45) Date of Patent: Jun. 4, 2024

(54) VEHICLE LAMP SYSTEM FOR DRAWING ROAD SURFACE PATTERN

(71) Applicant: KOITO MANUFACTURING CO., LTD., Tokyo (JP)

(72) Inventor: Naoki Tatara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/885,997

(22) Filed: Aug. 11, 2022

(65) Prior Publication Data

US 2022/0381415 A1 Dec. 1, 2022

Related U.S. Application Data

(63) Continuation of application No. PCT/JP2021/005361, filed on Feb. 12, 2021.

(30) Foreign Application Priority Data

Feb. 17, 2020 (JP) .................................. 2020-024282
Feb. 28, 2020 (JP) .................................. 2020-033672

(51) Int. Cl.
*B60Q 9/00* (2006.01)
*B60Q 1/50* (2006.01)
*G02B 27/01* (2006.01)

(52) U.S. Cl.
CPC .................. *B60Q 9/00* (2013.01); *B60Q 1/50* (2013.01); *B60Q 1/507* (2022.05);
(Continued)

(58) Field of Classification Search
CPC .............................. B60Q 2400/50; B60Q 1/50
See application file for complete search history.

(56) References Cited

U.S. PATENT DOCUMENTS 7,287,884 B2 * 10/2007 Koike .................... B60Q 1/543
                                                        348/148
8,547,298 B2 * 10/2013 Szczerba ............... G01S 13/867
                                                        340/436

(Continued)

FOREIGN PATENT DOCUMENTS

DE    102012023630 A1    6/2014
DE    102015201766 A1    8/2016
(Continued)

OTHER PUBLICATIONS

International Preliminary Report on Patentability Chapter I (PCT/IB/373 and PCT/ISA237) with translation dated Aug. 23, 2022, by The International Bureau of WIPO in corresponding International Patent Application No. PCT/JP2021/005361. (15 pages).

(Continued)

*Primary Examiner* — Hoi C Lau
(74) *Attorney, Agent, or Firm* — BUCHANAN INGERSOLL & ROONEY PC

(57) ABSTRACT

A lamp system includes a road surface drawing lamp that illuminates a road surface with a beam BM, and a lamp controlling unit that controls the road surface drawing lamp and draws, with the beam BM, a pattern PTN on the road surface ahead of a vehicle. The lamp controlling unit draws a first pattern before a start of a predetermined event and draws a second pattern at the start of the event. The first pattern includes first information to be presented in advance to a driver to allow the driver to respond to the event, and the second pattern includes second information corresponding to the event.

2 Claims, 9 Drawing Sheets

(52) U.S. Cl.
CPC ...... *G02B 27/0101* (2013.01); *B60Q 2400/50* (2013.01); *G02B 2027/0141* (2013.01)

(56) References Cited

U.S. PATENT DOCUMENTS

| | | | |
|---|---|---|---|
| 9,222,636 B2* | 12/2015 | Hatakeyama | B60K 35/00 |
| 9,481,287 B2* | 11/2016 | Marti | G01C 21/3697 |
| 9,845,043 B1* | 12/2017 | Webb | G08G 1/166 |
| 10,093,224 B2* | 10/2018 | Kim | G03B 21/147 |
| 10,232,713 B2* | 3/2019 | Kim | G08G 1/166 |
| 10,300,846 B2* | 5/2019 | Suzuki | B60Q 1/50 |
| 10,308,172 B2* | 6/2019 | Suzuki | B60Q 1/549 |
| 10,311,718 B2* | 6/2019 | Suzuki | B60Q 1/547 |
| 10,354,156 B2* | 7/2019 | Nishimura | G06V 20/582 |
| 10,457,199 B2* | 10/2019 | Kunii | B60Q 1/54 |
| 10,479,269 B2* | 11/2019 | Kim | B60Q 1/507 |
| 10,558,416 B2* | 2/2020 | Suzuki | B60Q 1/547 |
| 10,647,248 B2* | 5/2020 | Kunii | B60Q 1/38 |
| 10,766,405 B2* | 9/2020 | Yasuda | B25J 19/06 |
| 10,821,878 B2* | 11/2020 | Nakashima | F21S 41/125 |
| 11,273,755 B2* | 3/2022 | Wada | B60Q 1/50 |
| 11,584,298 B2* | 2/2023 | Takii | H04N 7/18 |
| 2003/0146827 A1* | 8/2003 | Koike | B60Q 1/543 340/436 |
| 2003/0147247 A1* | 8/2003 | Koike | B60Q 1/484 362/464 |
| 2006/0235597 A1* | 10/2006 | Hori | G08G 1/096758 701/96 |
| 2006/0267795 A1* | 11/2006 | Draaijer | G08G 1/04 340/907 |
| 2007/0280503 A1* | 12/2007 | Kubota | B60Q 1/543 382/103 |
| 2009/0013922 A1* | 1/2009 | Lin | B60Q 1/44 116/28 R |
| 2010/0157430 A1* | 6/2010 | Hotta | G02B 27/01 359/630 |
| 2010/0283590 A1* | 11/2010 | Tee | B62J 6/01 340/432 |
| 2012/0044708 A1* | 2/2012 | Schmidt | B60Q 1/12 362/466 |
| 2012/0075875 A1* | 3/2012 | Son | B60Q 1/543 315/77 |
| 2012/0092882 A1* | 4/2012 | Schmack | B60Q 1/18 362/487 |
| 2014/0028980 A1* | 1/2014 | Othmer | B60Q 1/543 353/14 |
| 2014/0062685 A1* | 3/2014 | Tamatsu | G08G 1/005 340/425.5 |
| 2014/0063824 A1* | 3/2014 | Guan | F21S 41/00 362/464 |
| 2014/0268353 A1* | 9/2014 | Fujimura | G02B 27/0101 359/630 |
| 2015/0145698 A1* | 5/2015 | Werner | H05B 47/185 340/928 |
| 2015/0203023 A1* | 7/2015 | Marti | B60W 50/14 340/425.5 |
| 2015/0298598 A1* | 10/2015 | Nüssli | H04N 9/3147 345/2.2 |
| 2016/0257243 A1* | 9/2016 | Son | B60Q 1/324 |
| 2017/0001554 A1* | 1/2017 | Sørensen | B60Q 1/346 |
| 2017/0038458 A1* | 2/2017 | Sugawara | G01S 17/931 |
| 2017/0072843 A1* | 3/2017 | Lection | B60Q 1/545 |
| 2017/0166111 A1* | 6/2017 | Baccarin | F21S 43/13 |
| 2017/0178591 A1* | 6/2017 | Takatsudo | B60R 1/00 |
| 2017/0182934 A1* | 6/2017 | Arita | H04N 9/3185 |
| 2017/0236459 A1* | 8/2017 | Masuda | G09F 13/02 362/545 |
| 2017/0253177 A1* | 9/2017 | Kawamata | B60K 35/00 |
| 2017/0255093 A1* | 9/2017 | Fujita | G01S 13/931 |
| 2017/0259731 A1* | 9/2017 | Son | B60Q 1/48 |
| 2017/0337821 A1* | 11/2017 | Masuda | H04N 9/3185 |
| 2018/0004020 A1* | 1/2018 | Kunii | B60Q 1/381 |
| 2018/0024359 A1* | 1/2018 | Yoneyama | H04N 9/3194 345/9 |
| 2018/0093607 A1* | 4/2018 | Omanovic | B60Q 1/34 |
| 2018/0118099 A1* | 5/2018 | Kunii | B60Q 1/38 |
| 2018/0154819 A1* | 6/2018 | Hoshino | F21S 41/147 |
| 2018/0186278 A1* | 7/2018 | Song | B60Q 1/143 |
| 2018/0257547 A1* | 9/2018 | Suzuki | B60Q 1/547 |
| 2018/0260182 A1* | 9/2018 | Suzuki | B60Q 1/547 |
| 2018/0261081 A1* | 9/2018 | Suzuki | B60Q 1/525 |
| 2018/0297470 A1* | 10/2018 | Kim | B60Q 1/085 |
| 2019/0016252 A1* | 1/2019 | Waragaya | B60Q 1/16 |
| 2019/0051185 A1* | 2/2019 | Masuda | G08G 1/166 |
| 2019/0118698 A1* | 4/2019 | Nakashima | G01M 11/065 |
| 2019/0118705 A1* | 4/2019 | Yu | G05D 1/0088 |
| 2019/0248277 A1* | 8/2019 | Kunii | B60Q 1/547 |
| 2019/0315269 A1* | 10/2019 | Kishigami | B60Q 1/346 |
| 2019/0322209 A1* | 10/2019 | Sugiyama | F21S 43/26 |
| 2019/0389368 A1* | 12/2019 | Yasuda | B60Q 1/50 |
| 2020/0063938 A1* | 2/2020 | Kurashige | F21S 41/285 |
| 2020/0070716 A1* | 3/2020 | Sakata | B60Q 1/50 |
| 2020/0114812 A1* | 4/2020 | Imaishi | B60Q 1/346 |
| 2020/0156533 A1* | 5/2020 | Lee | B60Q 1/085 |
| 2021/0078484 A1* | 3/2021 | Fujii | F21S 41/663 |
| 2021/0107396 A1 | 4/2021 | Omerbegovic et al. | |
| 2021/0146828 A1* | 5/2021 | Wada | B60Q 1/535 |
| 2021/0162927 A1* | 6/2021 | Takii | B60Q 1/50 |
| 2021/0178960 A1* | 6/2021 | Fenske | F21S 41/365 |
| 2021/0206312 A1* | 7/2021 | Mochizuki | B60Q 1/085 |
| 2021/0206316 A1* | 7/2021 | Mochizuki | B60Q 1/50 |
| 2021/0254806 A1* | 8/2021 | Choi | B60Q 1/52 |
| 2021/0300259 A1* | 9/2021 | Shibata | B60R 11/0229 |
| 2021/0355738 A1* | 11/2021 | Jang | G08G 1/133 |
| 2022/0118902 A1* | 4/2022 | Kunii | H04N 9/3179 |
| 2022/0120406 A1* | 4/2022 | Woo | F21S 43/20 |
| 2022/0219599 A1* | 7/2022 | Mochizuki | B60Q 1/346 |
| 2022/0221123 A1* | 7/2022 | Okubo | B60Q 1/34 |
| 2022/0350155 A1* | 11/2022 | Nakabayashi | G02B 27/0179 |
| 2022/0371509 A1* | 11/2022 | Okubo | F21S 43/27 |
| 2022/0381415 A1* | 12/2022 | Tatara | B60Q 1/34 |
| 2023/0041578 A1* | 2/2023 | Hamamoto | F21S 43/50 |
| 2023/0068705 A1* | 3/2023 | Kinoshita | H04N 23/74 |
| 2023/0131446 A1* | 4/2023 | Rueddenklau | G06V 10/141 703/8 |

FOREIGN PATENT DOCUMENTS

| | | |
|---|---|---|
| DE | 102017223434 A1 | 6/2019 |
| JP | H05221263 A | 8/1993 |
| JP | 2004306894 A | 11/2004 |
| JP | 2010032906 A | 2/2010 |
| JP | 2012247369 A | 12/2012 |
| JP | 2013010467 A | 1/2013 |
| JP | 2016055691 A | 4/2016 |
| JP | 2016101797 A | 6/2016 |
| JP | 2019018681 A | 2/2019 |
| JP | 2020198224 A | 12/2020 |
| WO | 2015133302 A1 | 9/2015 |
| WO | 2017119557 A1 | 7/2017 |
| WO | 2018138842 A1 | 8/2018 |
| WO | 2020031915 A1 | 2/2020 |

OTHER PUBLICATIONS

International Search Report (PCT/ISA/210) with translation dated Apr. 13, 2021, by the Japan Patent Office as the International Searching Authority for International Application No. PCT/JP2021/005361. (10 pages).

Office Action (Communication pursuant to Rule 164(1) EPC/The Partial Supplementary European Search Report) dated Aug. 10, 2023, in corresponding European Patent Application No. 21757151.2. (14 pages).

* cited by examiner

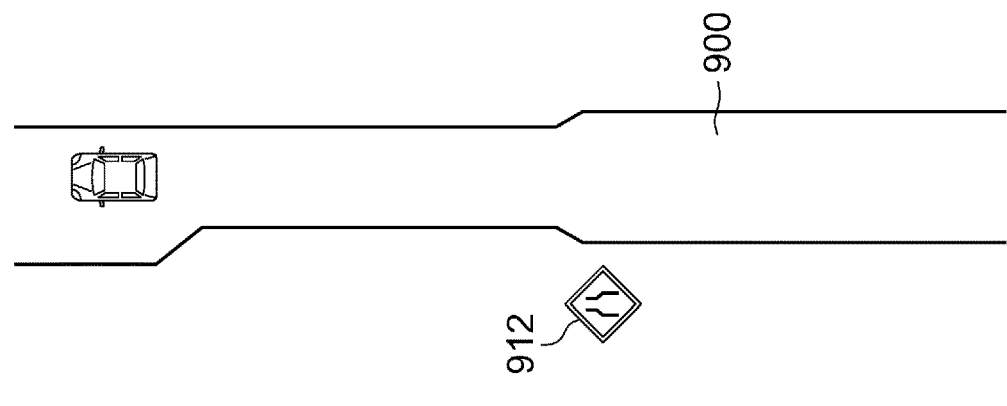
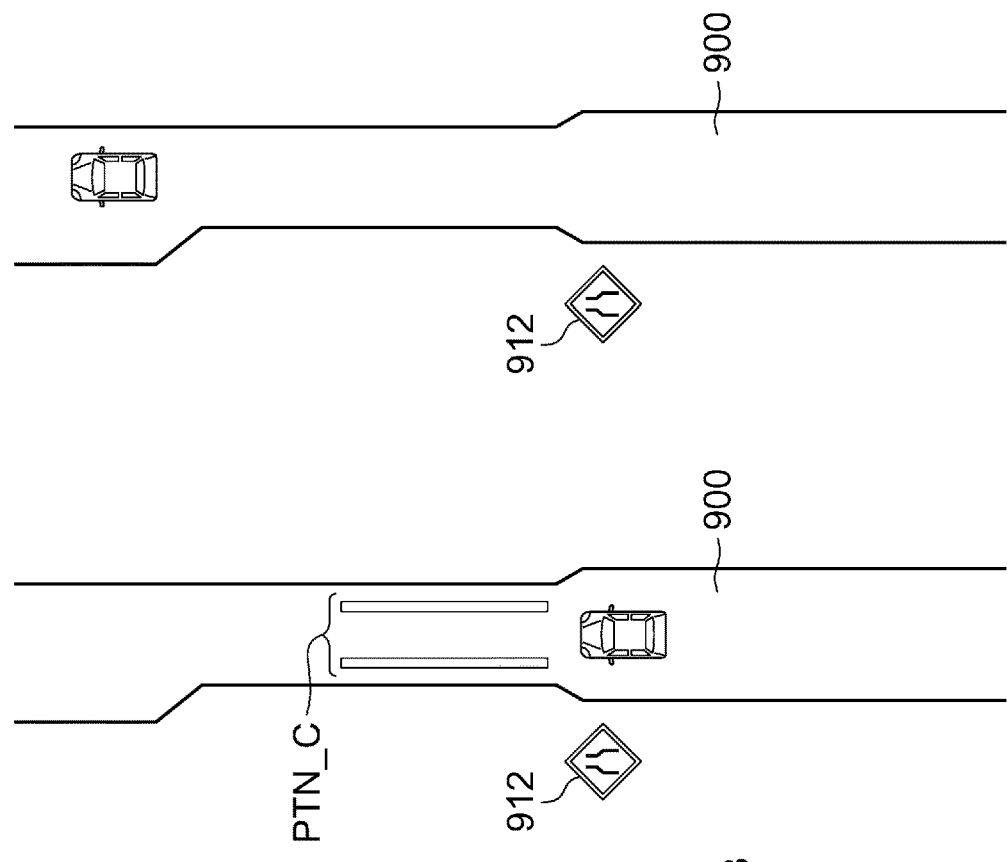
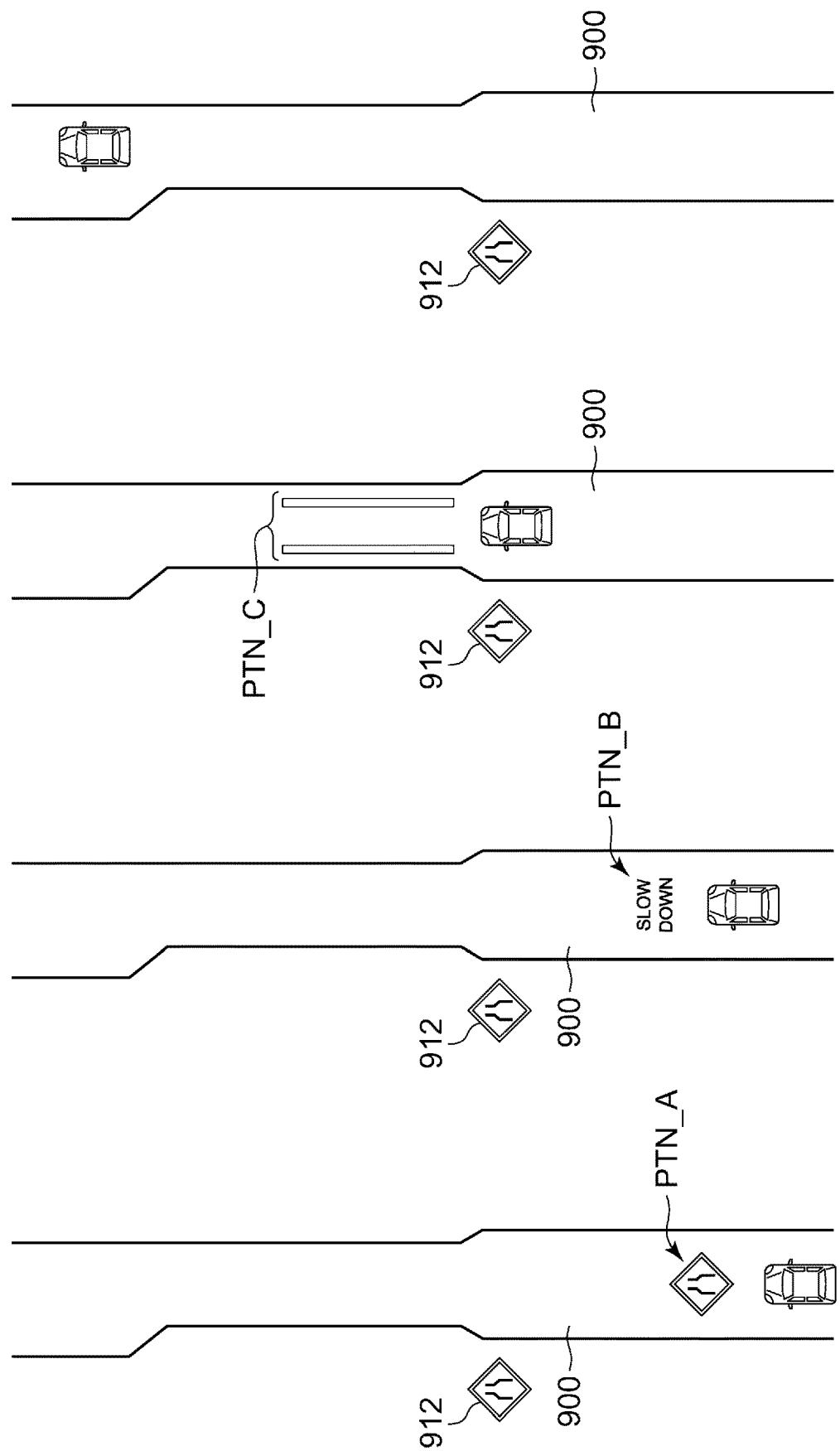
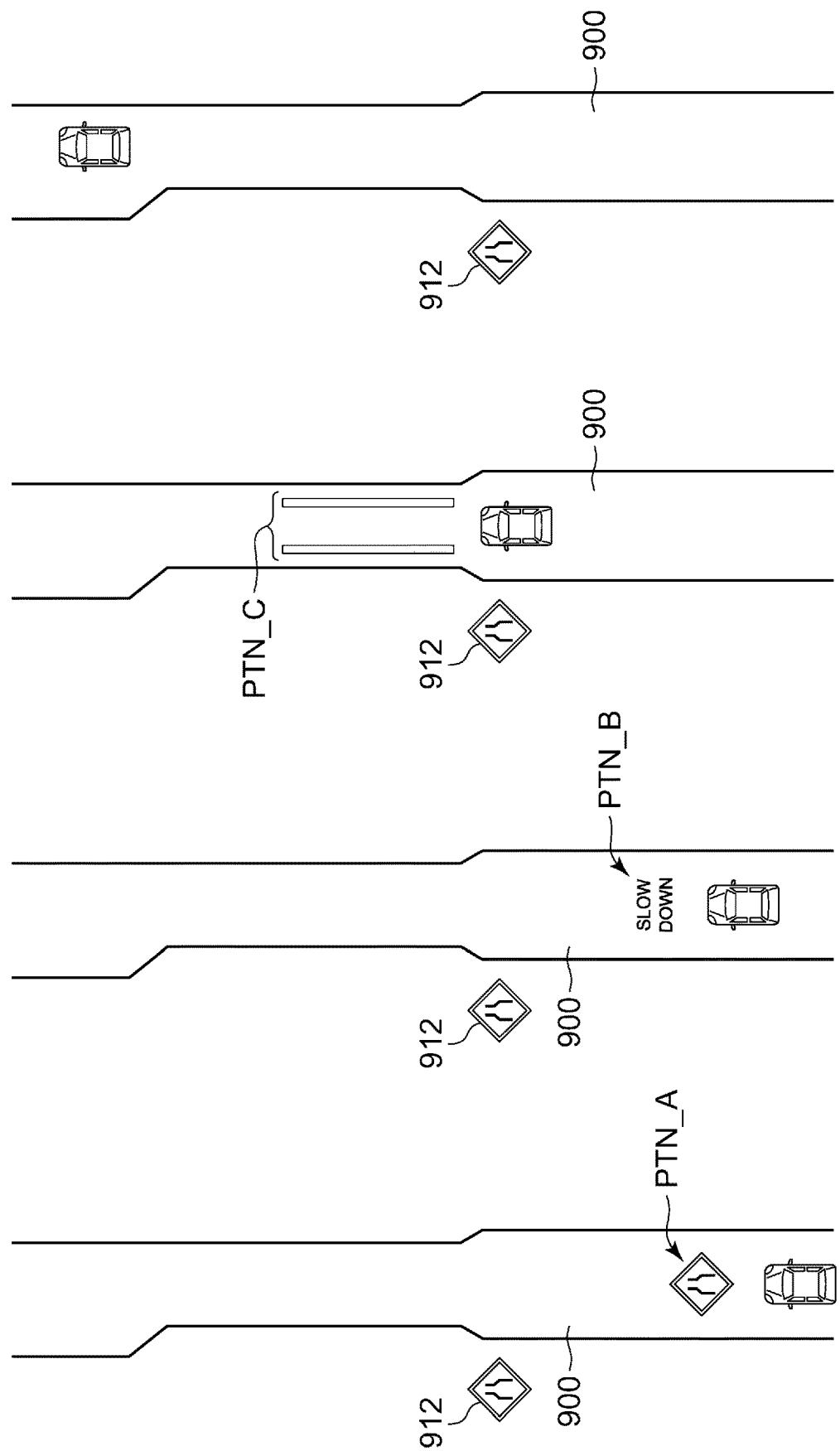

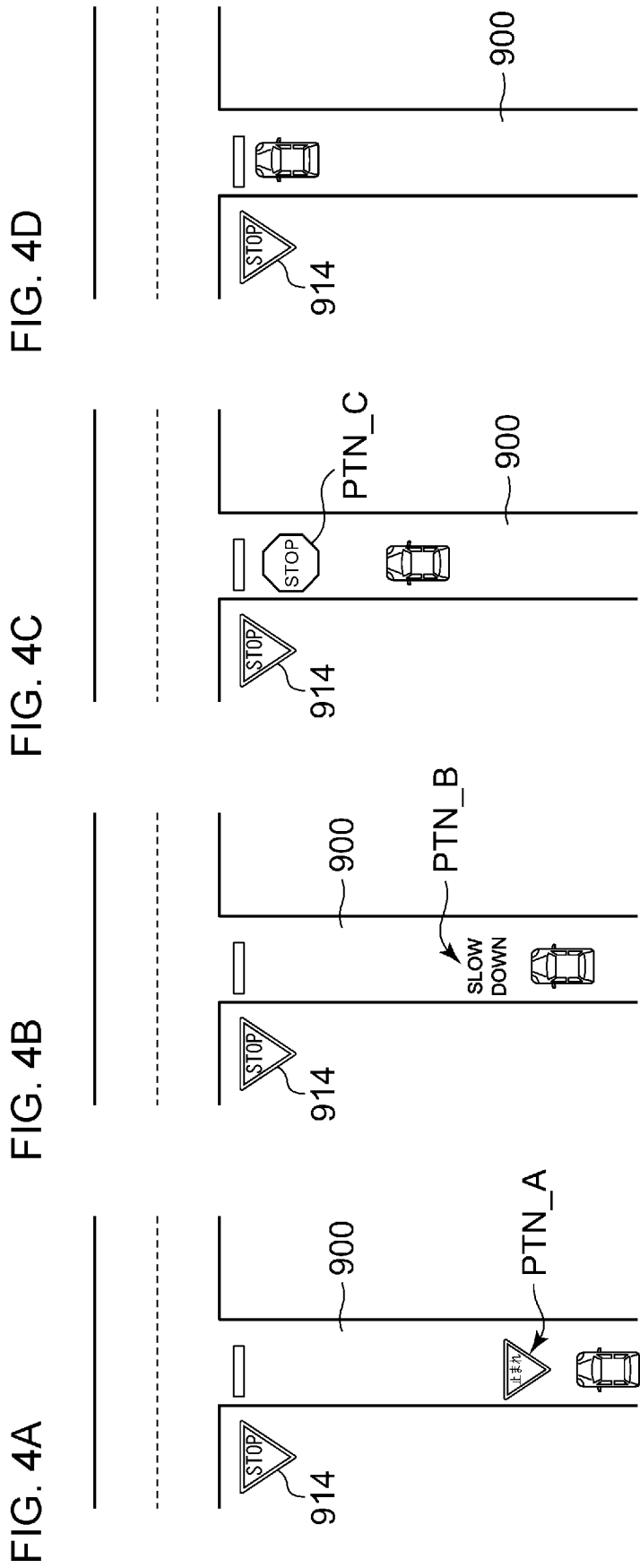

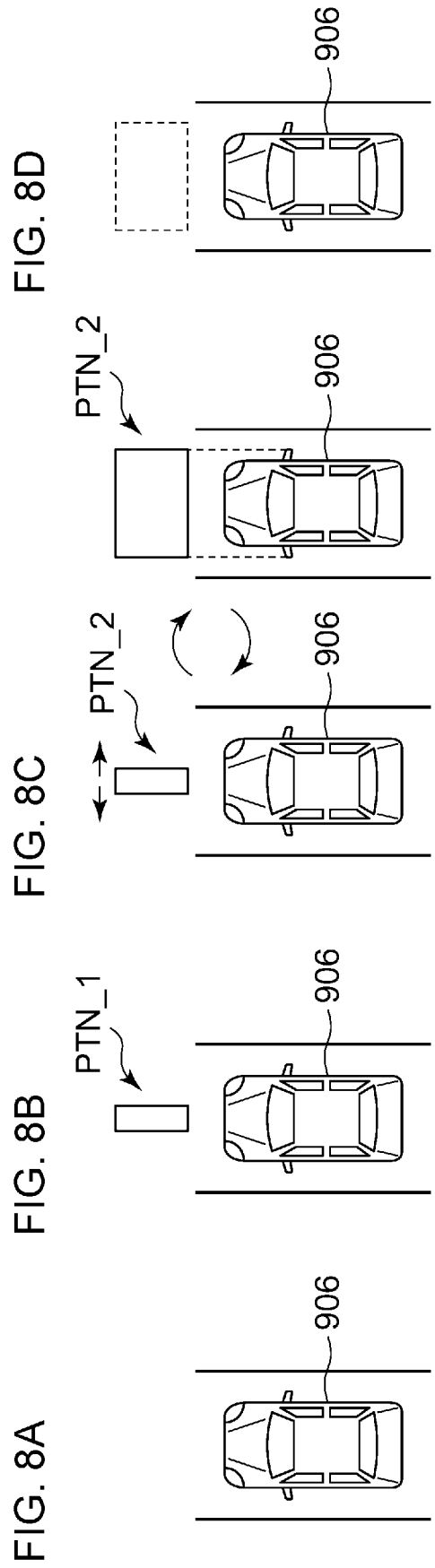

VEHICLE LAMP SYSTEM FOR DRAWING ROAD SURFACE PATTERN

BACKGROUND OF THE INVENTION

1. Technical Field

The present invention relates to lamp systems.

2. Description of the Related Art

Vehicle lamps are increasingly becoming of higher functionality, and as one example of such, a lamp that illuminates a road surface with a pattern of a light beam and draws a figure or a character has been proposed.

The present invention has been made in view of the above, and an exemplary object of an aspect of the present invention is to provide a lamp system that contributes to traffic safety.

SUMMARY OF THE INVENTION

1. A lamp system according to an aspect of the present invention includes a road surface drawing lamp that illuminates a road surface with a beam, and a lamp controlling unit that controls the road surface drawing lamp and draws, with the beam, a pattern on the road surface ahead of a vehicle. The lamp controlling unit draws a first pattern before a start of a predetermined event and draws a second pattern at the start of the event. The first pattern includes first information to be presented in advance to a driver to allow the driver to respond to the event, and the second pattern includes second information corresponding to the event.

Another aspect of the present invention also provides a lamp system. This lamp system includes a head-up display, a road surface drawing lamp, a HUD controlling unit, and a lamp controlling unit. The road surface drawing lamp illuminates a road surface with a beam. The HUD controlling unit controls the head-up display and displays, on the head-up display before a start of a predetermined event, first information to be presented in advance to a driver to allow the driver to respond to the event. The lamp controlling unit controls the road surface drawing lamp and draws, at the start of the event, a pattern including second information corresponding to the event on the road surface ahead of a vehicle.

2. A lamp system according to an aspect of the present invention includes a road surface drawing lamp that illuminates a road surface with a beam, and a controlling unit that controls the road surface drawing lamp and draws a pattern on the road surface with the beam. The controlling unit draws a moving start notification pattern on the road surface in response to any one of conditions having been met, and the conditions include that a parking brake has been released, that an accelerator brake has been released, that a vehicle starts moving, or that an accelerator has entered an on state.

It is to be noted that any optional combination of the above constituent elements or an embodiment obtained by replacing constituent elements of the present invention or what is expressed by the present invention between a method, an apparatus, a system, and so on is also valid as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A to 2D are illustrations for describing an operation of a lamp system in a narrow road ahead event;

FIGS. 4A to 4D are illustrations for describing an operation of a lamp system in a stop event;

FIG. 8A to 8D are illustrations for describing, in time series, an operation of a lamp system in moving start notification.

DETAILED DESCRIPTION OF THE INVENTION

Figure 1:
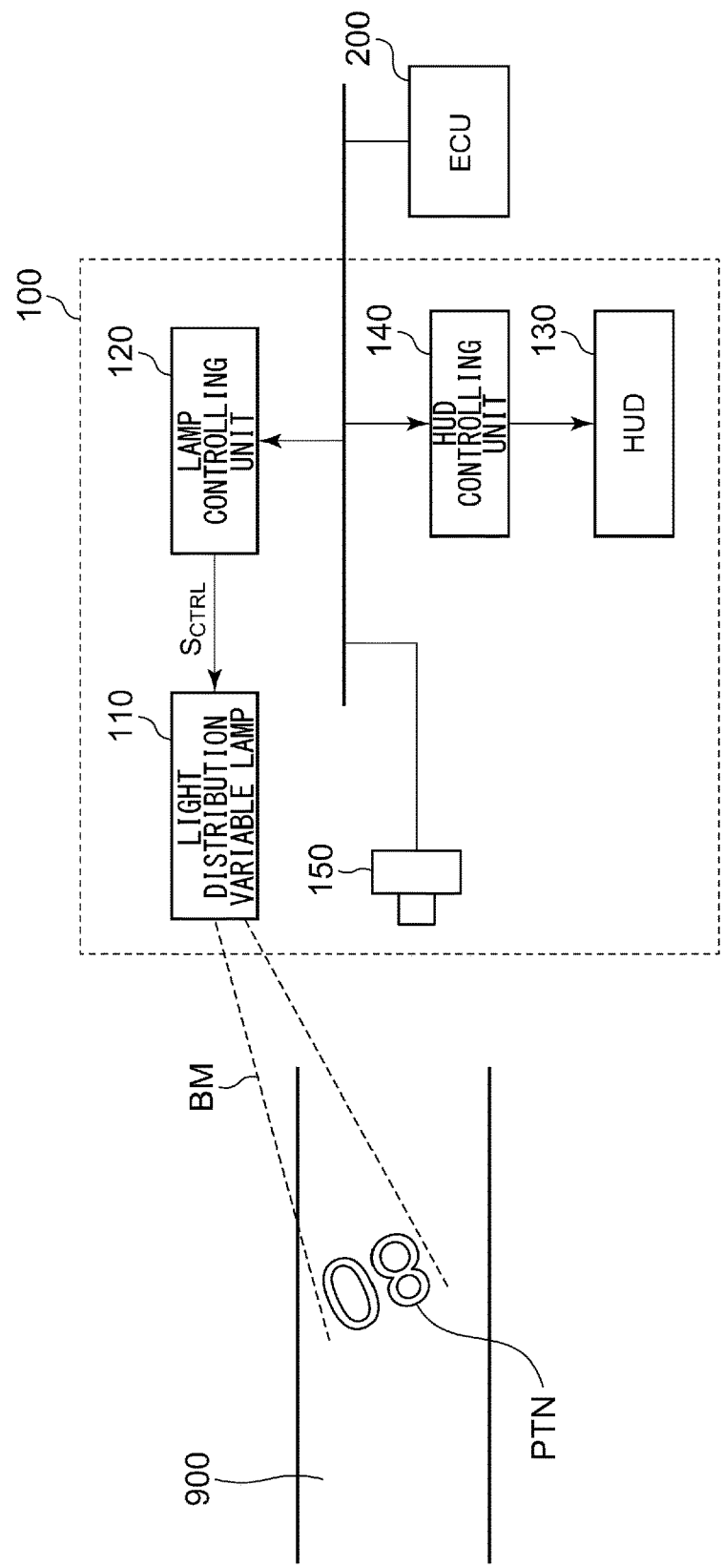
FIG. 1 is a block diagram of a lamp system according to Embodiment 1.

Hereinafter, the present invention will be described based on some exemplary embodiments and with reference to the drawings. The embodiments are illustrative in nature and are not intended to limit the invention. Not all the features and combinations thereof described according to the embodiments are necessarily essential to the invention. Identical or equivalent constituent elements, members, or processes illustrated in the drawings are given identical reference characters, and duplicate description thereof will be omitted, as appropriate.

Embodiment 1

FIG. 1 is a block diagram of a lamp system 100 according to Embodiment 1. The lamp system 100 includes a light distribution variable lamp (road surface drawing lamp) 110, a lamp controlling unit 120, a head-up display (HUD) 130, a HUD controlling unit 140, and a camera 150. The actual lamp system 100 further includes a high beam, a low beam, and so on, but these components are omitted in this example.

The light distribution variable lamp 110 receives, from the lamp controlling unit 120, a control signal $S_{CTRL}$ instructing a pattern PTN to be drawn on a road surface 900. Then, the light distribution variable lamp 110 illuminates the road surface 900 ahead of the vehicle with a beam BM having an intensity distribution corresponding to the control signal $S_{CTRL}$ and draws the pattern PTN on the road surface 900.

There is no particular limitation on the configuration of the light distribution variable lamp 110, and the light distribution variable lamp 110 may include, for example, a semiconductor light source, such as a laser diode (LD) or a light emitting diode (LED), and a lighting circuit that drives the semiconductor light source to turn it on. To form an illuminance distribution corresponding to a pattern PTN, the light distribution variable lamp 110 may include a pattern forming device of a matrix type, such as a digital mirror device (DMD) or a liquid crystal device. Alternatively, the light distribution variable lamp 110 may be an array of light emitting elements (also called μ-LED).

An illumination area that the light distribution variable lamp 110 illuminates is set to cover at least the road surface 900. The illumination area that the light distribution variable lamp 110 illuminates may overlap a part of an illumination area of a low beam. Hence, the light distribution variable lamp 110 may form a pattern PTN with an illuminance higher than that of a low beam.

The lamp controlling unit 120 controls the light distribution variable lamp 110. The lamp controlling unit 120 can be formed by a digital processor. The lamp controlling unit 120 may be formed, for example but not limited to, by a combination of a microcomputer including a CPU and a software program or by a field programmable gate array (FPGA) or an application specific IC (ASIC).

To be more specific, the lamp controlling unit 120 controls the light distribution variable lamp 110 and draws a pattern PTN for drive assistance on a road surface 900 with a beam BM. There is no particular limitation on a pattern PTN to be drawn, and, for example, a legal speed limit, a road sign, or the like may be drawn for the driver's easy recognition. Alternatively, the traveling direction of the host vehicle may be drawn to assist drivers of other vehicles. In any case, a pattern PTN does not merely provide illumination like a low beam but includes information to be presented to the driver or other participants in the traffic.

The HUD 130 is a display and is constituted, for example, by a windshield. The HUD controlling unit 140 displays, on the HUD 130, information appropriate for a given traveling situation.

To be more specific, the HUD controlling unit 140 presents the driver with information for drive assistance by controlling display on the HUD 130. This information includes, for example but not limited to, (i) extrinsic information that the vehicle should obey, (ii) information linked to a car navigation system, or (iii) information concerning the host vehicle. (i) Extrinsic information may include, for example, a speed limit, Do No Enter, or Stop, and such information may be acquired by the camera 150 capturing an image of a road sign or from a car navigation system. (ii) Information linked to a car navigation system includes, for example, a moving path, a name of an intersection to turn, or the distance to that intersection. (iii) Information concerning the host vehicle includes the vehicle speed, the number of engine rotations, the amount of remaining fuel, various warnings concerning the vehicle.

The camera 150 captures an image ahead of the vehicle. The lamp controlling unit 120 may control a pattern PTN that the light distribution variable lamp 110 is to draw on a road surface 900, based on an image captured by the camera 150 (hereinafter, referred to as a camera image IMG). Meanwhile, the HUD controlling unit 140 may control information to be displayed on the HUD 130 based on a camera image IMG.

An electronic control unit (ECU) 200 controls the lamp system 100 as a whole. For example, the ECU 200 generates a command to, for example, turn on or off the light distribution variable lamp 110. Moreover, the ECU 200 transmits information necessary for light distribution control to the lamp controlling unit 120.

As illustrated in FIG. 1, the lamp controlling unit 120 and the HUD controlling unit 140 may be connected via a bus and allowed to cooperate directly therebetween. Alternatively, a processor (e.g., the ECU 200) serving as a host may be provided between the lamp controlling unit 120 and the HUD controlling unit 140, and the lamp controlling unit 120 and the HUD controlling unit 140 may be allowed to cooperate indirectly therebetween.

The lamp system 100 draws a pattern PTN that includes information (hereinafter, referred to as first information) to be presented to the driver before the start of a predetermined event EVT_# so that the driver can respond to that event EVT_# (# denotes a character distinguishing a given event, and, for example the notation #=1, 2, . . . is used). Alternatively, the lamp system 100 displays first information on HUD 130 before the start of a predetermined event EVT_#. First information may indicate the contents of an event EVT_#. Presenting the contents of an event EVT_# before the start of the event EVT_# allows the driver to take necessary action before the start of the event EVT_# to respond to that event EVT_#. Alternatively, first information may indicate action that the driver should take before the start of an event EVT_#. First information can be regarded as playing a role of advance notice indicating that an event EVT_# is to occur.

The lamp system 100 further draws a pattern PTN that includes information (hereinafter, referred to as second information) corresponding to an event EVT_# at the start of the event EVT_#, and turns off the pattern PTN at the end of the event EVT_#. Second information may be information to be presented to the driver to assist the driver in driving during an event EVT_#.

An occurrence or the end of an event EVT_# may be determined by the lamp controlling unit 120 or the ECU 200.

An operation of the lamp system 100 will be described below in specific terms based on examples.

Example 1

In Example 1, a predetermined event EVT_1 is narrowing of the road ahead. FIGS. 2A to 2D are illustrations for describing an operation of the lamp system 100 in a narrow road ahead event EVT_1.

The event EVT_1 may be determined to occur shortly based on a camera image IMG capturing a road sign 912 for Road Narrows Ahead or based on information acquired from a car navigation system. Then, a pattern PTN_A that includes information (first information) indicating that the event EVT_1 is narrowing of the road ahead is drawn on a road surface 900, as illustrated in FIG. 2A. In FIG. 2A, the pattern PTN_A includes a figure (first information) depicting the road sign for Road Narrows Ahead.

Next, as illustrated in FIG. 2B, a pattern PTN_B that includes information (first information) instructing the driver to slow down-action that the driver should take before the start of the event EVT_1—is drawn on the road surface 900. In FIG. 2B, the pattern PTN_B includes characters (first information) instructing the driver to slow down.

Drawing the patterns PTN_A and PTN_B on the road surface 900, as in FIGS. 2A and 2B, allows the driver to take action, or slow down, before the start of the event to respond to the narrow road ahead event, that is, the event of traveling on a narrow road, and this allows the driver to come upon the event safely. In this example, for a pattern PTN including first information, either one of the patterns PTN shown in FIGS. 2A and 2B may be drawn on the road surface 900, and the other pattern PTN does not have to be drawn.

Next, when the distance to the location where the road starts narrowing becomes no greater than a certain distance, the event EVT_1 is determined to occur (start). Then, a pattern PTN_C that includes information (second information) for drive assistance in the narrow road ahead event is drawn on the road surface 900, as illustrated in FIG. 2C. In FIG. 2C, the pattern PTN_C includes a figure (second information) indicating the width of the vehicle. The width of the vehicle may be the distance between predetermined parts of the right and left tires, the width of the vehicle body, or the distance between predetermined parts of the right and left mirrors. A predetermined part of a tire may be the outermost edge of the tire in the widthwise direction of the vehicle or a center portion of the tire in the widthwise direction of the vehicle. A predetermined part of a mirror may be the outermost edge of the mirror in the widthwise direction of the vehicle.

Drawing the pattern PTN_C indicating the width of the vehicle on the road surface allows the driver to grasp the width of the vehicle, and this can reduce the likelihood of running off the road or making contact with an obstacle, such as a wall. Moreover, such a drawing can notify participants in the traffic (pedestrians or other vehicles) that the host vehicle is approaching and can prompt such participants to take evasive action.

In response to the event EVT_1 determined to have ended, the pattern PTN_C indicating the width of the vehicle is turned off, as illustrated in FIG. 2D.

Example 2

A predetermined event EVT_2 in Example 2 is a change in the traveling direction, that is, a right or left turn. FIGS. 3A to 3D are illustrations for describing an operation of the lamp system 100 in a traveling direction change event EVT_2.

Figure 3D:
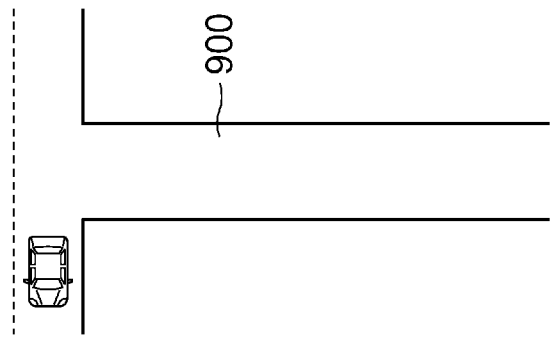
FIGS. 3A to 3D are illustrations for describing an operation of a lamp system in a traveling direction change event.
Figure 3C:
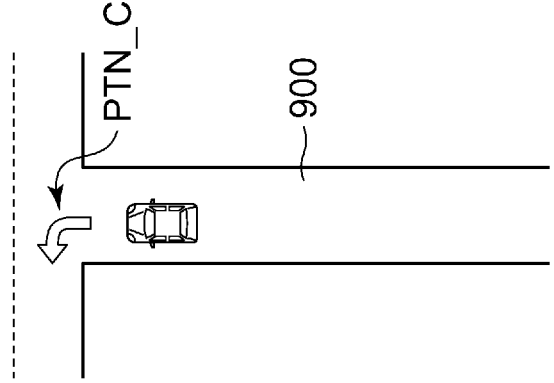

The event EVT_2 may be determined to occur shortly based on information acquired from a car navigation system. Then, a pattern PTN_A that includes information (first information) indicating that the event EVT_2 is a change in the traveling direction is drawn on a road surface 900, as illustrated in FIG. 3A. In FIG. 3A, the pattern PTN_A includes an arrow indicating the direction into which the traveling direction is to change and characters indicating the distance to the location where the traveling direction changes.

Figure 3B:
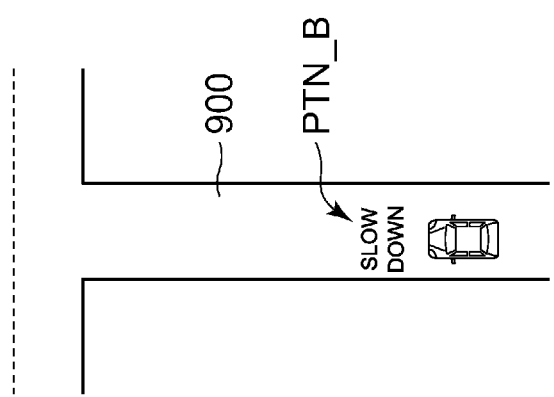
Figure 3A:
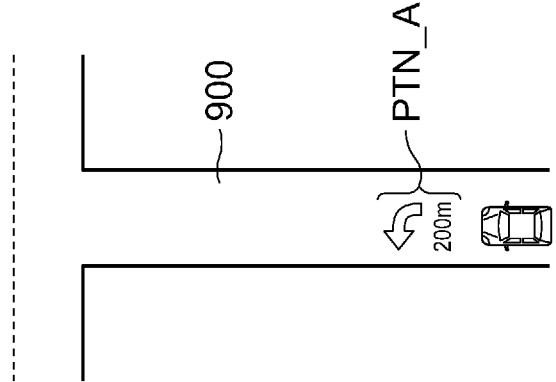

Next, as illustrated in FIG. 3B, a pattern PTN_B that includes information (first information) instructing the driver to slow down-action that the driver should take before the start of the event EVT_2—is drawn on the road surface 900. In FIG. 3B, the pattern PTN_B includes characters (first information) instructing the driver to slow down.

Drawing the patterns PTN_A and PTN_B on the road surface 900, as in FIGS. 3A and 3B, allows the driver to take action, or slow down, before the start of the event to respond to the traveling direction change event, and this allows the driver to come upon the event safely. In this example, for a pattern PTN including first information, either one of the patterns PTN shown in FIGS. 3A and 3B may be drawn on the road surface 900, and the other pattern PTN does not have to be drawn.

Next, when the distance to the location where the traveling direction changes becomes no greater than a certain distance, the event EVT_2 is determined to occur (start). Then, a pattern PTN_C that includes information (second information) indicating the direction into which the traveling direction should change is drawn on the road surface 900, as illustrated in FIG. 3C. In FIG. 3C, the pattern PTN_C that includes an arrow indicating a left turn is drawn on the road surface 900.

In response to the event EVT_2 determined to have ended, the pattern PTN_C indicating a change in the traveling direction is turned off, as illustrated in FIG. 3D.

Example 3

In Example 3, a predetermined event EVT_3 is a stop. FIGS. 4A to 4D are illustrations for describing an operation of the lamp system 100 in a stop event EVT_3.

The event EVT_3 may be determined to occur shortly based on a camera image IMG capturing a road sign 914 for Stop or based on information acquired from a car navigation system. Then, a pattern PTN_A that includes information (first information) indicating that the event EVT_3 is a stop is drawn on a road surface 900, as illustrated in FIG. 4A. In FIG. 4A, the pattern PTN_A includes a figure (first information) depicting the road sign for Stop.

Next, as illustrated in FIG. 4B, a pattern PTN_B that includes information (first information) instructing the driver to slow down-action that the driver should take before the start of the event EVT_3—is drawn on the road surface 900. In FIG. 4B, the pattern PTN_B includes characters (first information) instructing the driver to slow down.

Drawing the patterns PTN_A and PTN_B on the road surface 900, as in FIGS. 4A and 4B, allows the driver to take action, or slow down, before the start of the event to respond to the stop event, and this allows the driver to come upon the event safely. In this example, for a pattern PTN including first information, either one of the patterns PTN shown in FIGS. 4A and 4B may be drawn on the road surface 900, and the other pattern PTN does not have to be drawn.

Next, in response to the event EVT_3 detected to occur, a pattern PTN_C that includes a figure (second information) indicating that the driver should stop is drawn on the road surface 900, as illustrated in FIG. 4C.

In response to the event EVT_3 determined to have ended, the pattern PTN_C that includes the figure indicating that the driver should stop is turned off, as illustrated in FIG. 4D.

In Examples 1 to 3, cases where first information is provided to the driver via drawings on the road surface have been described. Alternatively, first information may be provided to the driver via display on the HUD 130.

FIGS. 5A to 5D are illustrations for describing how the lamp system 100 operates in a narrow road ahead event EVT_1, in which first information is displayed on the HUD 130. FIGS. 5A to 5D show the field of view of the driver. In this section, a case where first information is displayed on the HUD 130 is described with the narrow road ahead event EVT_1 illustrated as an example. In other events as well, first information may be displayed on the HUD 130.

Figure 5A:
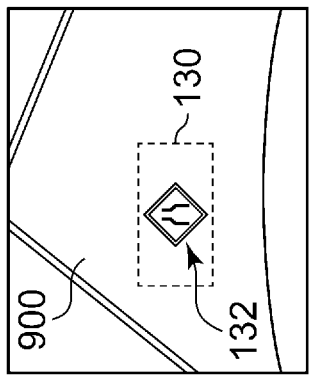
FIGS. 5A to 5D are illustrations for describing how a lamp system operates in a narrow road ahead event, in which first information is displayed on a HUD.

In response to the event EVT_1 detected to occur shortly, information (first information) 132 indicating that the event EVT_1 is narrowing of the road ahead is displayed on the HUD 130, as illustrated in FIG. 5A. In FIG. 5A, the information 132 is a figure depicting the road sign for Road Narrows Ahead.

Figure 5B:
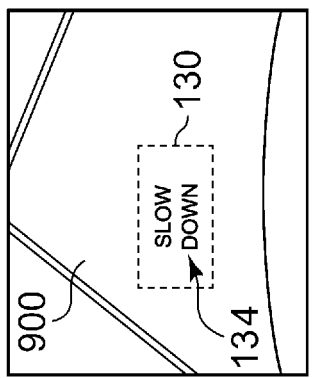

Next, as illustrated in FIG. 5B, information (first information) 134 instructing the driver to slow down-action that the driver should take before the start of the event EVT_1— is displayed on the HUD 130. In FIG. 5B, the information 134 includes characters instructing the driver to slow down.

In this example, either one of the information shown in FIG. 5A or the information shown in FIG. 5B may be displayed on the HUD 130, and the other information does not have to be displayed on the HUD 130.

Instead of the information shown in FIG. 5A displayed on the HUD 130, the pattern PTN_A shown in FIG. 2A may be drawn on a road surface 900. Meanwhile, instead of the information shown in FIG. 5B displayed on the HUD 130, the pattern PTN_B shown in FIG. 2B may be drawn on the road surface 900.

In other words, a pattern PTN indicating the contents of an event, as in FIG. 2A, may be drawn on the road surface 900, and then information indicating action that the driver should take before the start of the event, as in FIG. 5B, may be displayed on the HUD 130. Alternatively, the contents of an event, as in FIG. 5A, may be displayed on the HUD 130, and then a pattern PTN that includes information indicating action that the driver should take before the start of the event, as in FIG. 2B, may be drawn on the road surface 900.

Figure 5C:
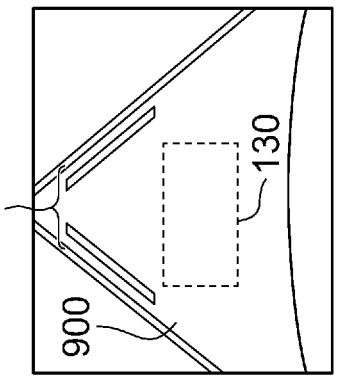
Figure 5D:
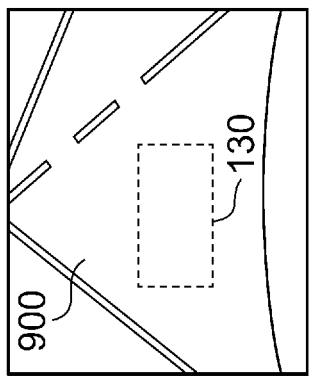

Next, in response to the event EVT_1 determined to occur, a pattern PTN that includes information (second information) for assisting the driver in the narrow road ahead event is drawn on the road surface 900, as illustrated in FIG. 5C. Then, in response to the event EVT_1 determined to have ended, the pattern PTN is turned off.

The driver as well as other participants in the traffic may feel annoyed if drawings appear on a road surface 900 frequently. Yet, such annoyance can be alleviated if first information is presented via the HUD 130 and second information is presented via a drawing on the road surface. The position on the HUD 130 where an image is displayed is closer to the driver than an object (another vehicle, a pedestrian, or a road sign) ahead of the vehicle. Therefore, the driver needs to shift the focus in order to focus on the HUD 130 while driving. Hence, the driver may not notice the display on the HUD 130. In this respect, the road surface 900 requires a shorter distance than the HUD 130 by which the driver needs to move his or her eyes from an object ahead of the vehicle, and this lessens the shift in the focus. Accordingly, presenting second information—more important information—not on the HUD 130 but via a drawing on the road surface allows the second information to be transmitted to the driver reliably.

Embodiment 1 has been described above. Now, a variation of Embodiment 1 will be described.

Variation 1-1

According to Embodiment 1, the light distribution variable lamp 110 is a light source additional to a low beam and a high beam. Alternatively, the function of at least one of a low beam or a high beam may be integrated with the light distribution variable lamp 110.

Embodiment 2

Figure 6:
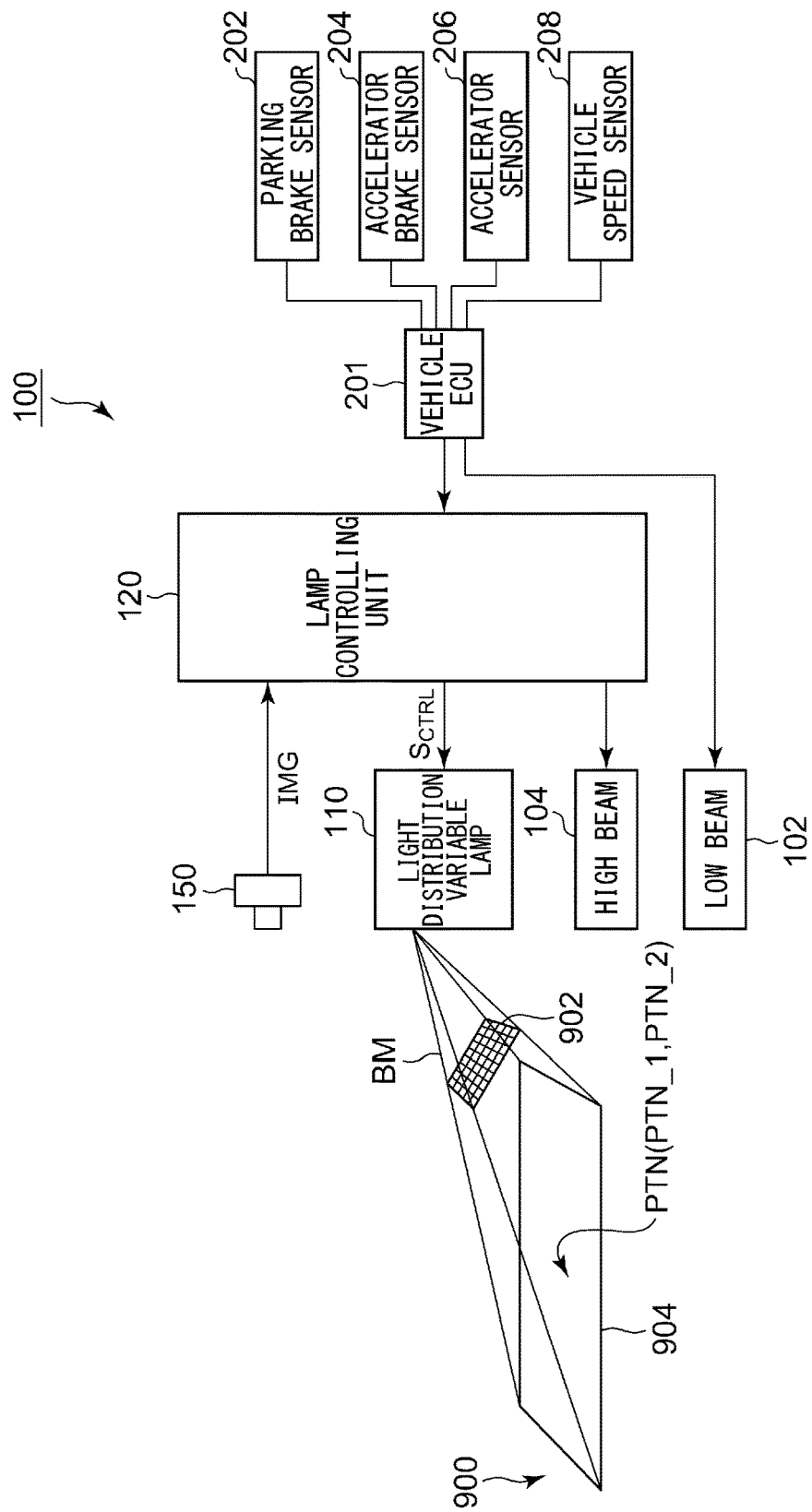
FIG. 6 is a block diagram of a lamp system according to Embodiment 2.

FIG. 6 is a block diagram of a lamp system 100 according to Embodiment 2. The lamp system 100 includes a light distribution variable lamp (road surface drawing lamp) 110, a lamp controlling unit 120, a low beam 102, a high beam 104, and a camera 150. These components may all be contained within a single housing, or some of these components may be provided outside a housing, that is, provided in the vehicle.

According to the present embodiment, the light distribution variable lamp 110 is provided additionally to and separately from the low beam 102 and the high beam 104. Hence, the light distribution variable lamp 110 may also be referred to as an additional beam.

The light distribution variable lamp 110 receives, from the lamp controlling unit 120, a control signal $S_{CTRL}$ instructing a pattern PTN to be drawn on a road surface 900. Then, the light distribution variable lamp 110 illuminates the road surface 900 ahead of the vehicle with a beam BM having an intensity distribution 902 corresponding to the control signal $S_{CTRL}$ and draws the pattern PTN on the road surface 900. The pattern PTN is formed within an illumination area 904 of the beam BM.

There is no particular limitation on the configuration of the light distribution variable lamp 110, and the light distribution variable lamp 110 may include, for example, a semiconductor light source, such as an LD or an LED, and a lighting circuit that drives the semiconductor light source to turn it on. To form an illuminance distribution corresponding to a pattern PTN, the light distribution variable lamp 110 may include a pattern forming device of a matrix type, such as a DMD or a liquid crystal device. Alternatively, the light distribution variable lamp 110 may be an array of light emitting elements (also called µ-LED).

An illumination area that the light distribution variable lamp 110 illuminates is set to cover at least the road surface 900. The illumination area that the light distribution variable lamp 110 illuminates may overlap a part of an illumination area of the low beam 102. Hence, the light distribution variable lamp 110 may form a pattern PTN with an illuminance higher than that of the low beam.

The camera 150 captures an image ahead of the vehicle. The lamp controlling unit 120 may control a pattern PTN that the light distribution variable lamp 110 is to draw on a road surface 900, based on an image captured by the camera 150 (hereinafter, referred to as a camera image IMG).

Like the light distribution variable lamp 110, the high beam 104 may also be capable of varying its light distribution. In this case, the lamp controlling unit 120 may control the light distribution of the high beam 104 based on a camera image IMG.

A command to, for example, turn on or off the light distribution variable lamp 110, the low beam 102, or the high beam 104 is transmitted from a vehicle ECU 201 to the lamp system 100. Moreover, information necessary for light distribution control is transmitted from the vehicle ECU 201 to the lamp system 100.

The vehicle ECU 201 is connected to a parking brake sensor 202, an accelerator brake sensor 204, an accelerator sensor 206, and a vehicle speed sensor 208. The parking brake sensor 202 detects an ON/OFF switch of a parking brake. The accelerator brake sensor 204 detects an ON/OFF switch of an accelerator brake (e.g., foot brake). The accelerator sensor 206 detects an operation amount of an accelerator pedal. The vehicle speed sensor 208 detects the vehicle speed by detecting the rotation speed of the wheels. An angle sensor transmits its detection result to the lamp controlling unit 120 at predetermined cycles.

The lamp controlling unit 120 can be formed by a digital processor. The lamp controlling unit 120 may be formed, for example but not limited to, by a combination of a microcomputer including a CPU and a software program or by an FPGA or an ASIC.

To be more specific, the lamp controlling unit 120 controls the light distribution variable lamp 110 and draws a pattern PTN on a road surface 900 with a beam BM. For example, the lamp controlling unit 120 draws a pattern PTN indicating that the host vehicle is to start moving or a pattern PTN indicating the direction of a right or left turn.

The above describes a basic configuration of the lamp system 100. Now, an operation of the lamp system 100 will be described.

Figure 7:
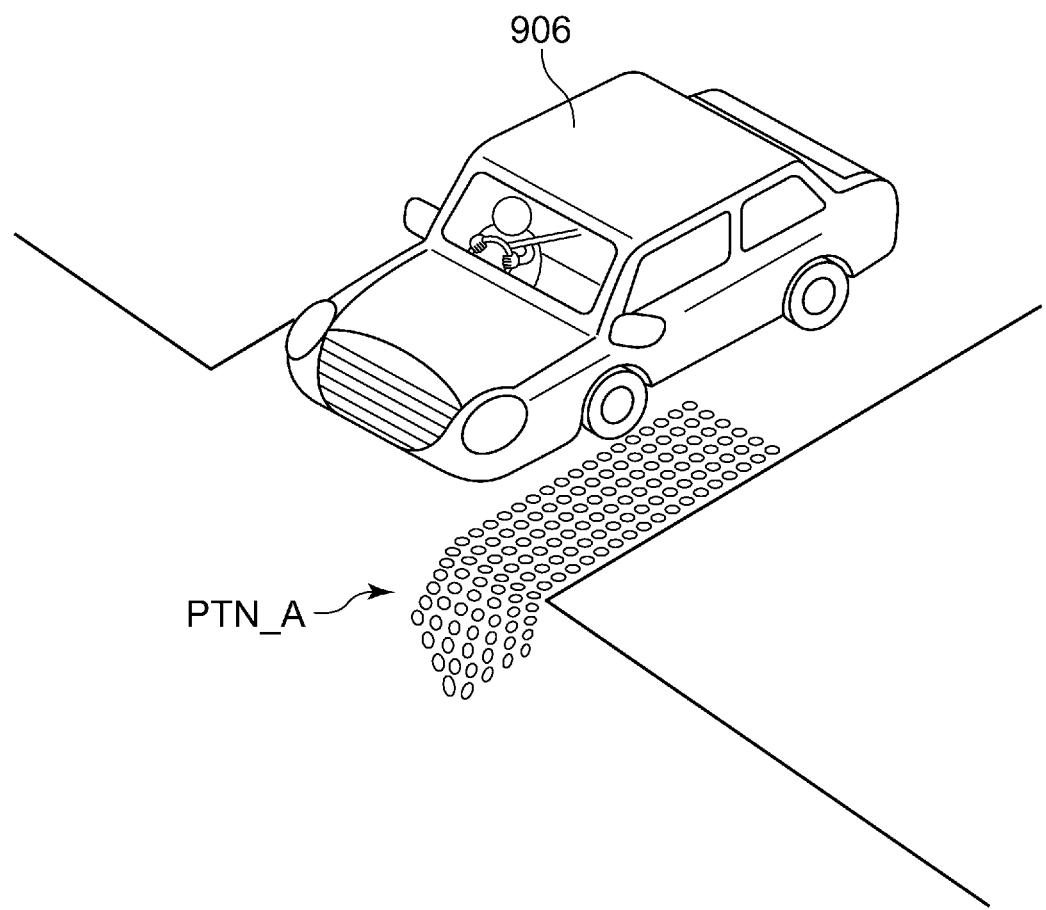
FIG. 7 illustrates an example of a pattern that a light distribution variable lamp illustrated in FIG. 6 draws on a road surface.

FIG. 7 illustrates an example of a pattern PTN (PTN_A) that the light distribution variable lamp 110 draws on a road surface 900. FIG. 7 illustrates a scene during the vehicle's traveling, and the pattern PTN_A drawn on the road surface 900 is a pattern that indicates the direction of a right or left turn. The pattern PTN_A includes a plurality of dots and indicates the direction of a right or left turn by the shape formed by the plurality of dots. The lamp controlling unit 120 may display the pattern PTN_A in conjunction with an operation of the direction indicator (blinker). Indicating the direction of a right or left turn via a drawing composed of a plurality of dots can attract attention of pedestrians or drivers of other vehicles and let them know the direction of a right or left turn reliably.

FIG. 8A to 8D are illustrations for describing, in time series, an operation of the lamp system 100 in moving start notification. In FIG. 8A, a vehicle 906 provided with the lamp system 100 is stopped. In FIG. 8B, a first pattern PTN_1 is drawn on a road surface 900 ahead of the vehicle 906. The lamp controlling unit 120 draws the first pattern PTN_1 in response to a first condition having been met. The first condition is that the ignition switch has entered an on state or that the parking brake has been released. In this example, the first pattern PTN_1 includes a rectangular figure extending in the traveling direction.

In FIG. 8C, a second pattern PTN_2 is drawn on the road surface 900 ahead of the vehicle 906. The lamp controlling unit 120 changes the pattern to draw on the road surface 900 from the first pattern PTN_1 to the second pattern PTN_2, in response to a second condition having been met. The second condition is that the parking brake has been released, that the accelerator brake has been released, that the vehicle has started moving (i.e., the detection value of the vehicle speed sensor 208 has exceeded 0), or that the accelerator has entered an on state. In other words, the second pattern PTN_2 is a moving start notification pattern for notifying that the vehicle has started moving or that the vehicle will start moving. In a case where the first condition is that the parking brake has been released, that the parking brake has been released is excluded from the second condition.

In this example, the second pattern PTN_2 is an animation in which a figure is stretched repeatedly in the widthwise direction of the vehicle. The second pattern PTN_2 may be an animation in which the figure shown in FIG. 8B is stretched. In the second pattern PTN_2, the figure may be stretched to match the width of the vehicle 906. The width of the vehicle 906 may be the width of the vehicle body of the vehicle 906, the distance between predetermined parts (e.g., the outermost edges) of the right and left tires, or the distance between predetermined parts (e.g., the outermost edges) of the right and left mirrors. After the vehicle 906 has started moving, the animation speed of the second pattern PTN_2—the speed at which the figure is stretched in the example illustrated in FIG. 8C—may be changed in accordance with the speed of the vehicle 906.

It suffices that a second pattern PTN_2 differ from a first pattern PTN_1, and a second pattern PTN_2 is not limited to an animation. That a second pattern PTN_2 differs from a first pattern PTN_1 means that they differ in terms of at least one of the shape, the size, the color, the presence of animation, the contents of animation, or the presence of blinking of the figures included in the respective patterns.

In FIG. 8D, the second pattern PTN_2 is turned off. The lamp controlling unit 120 turns off the second pattern PTN_2, in response to a third condition having been met. The third condition is that a predetermined time has passed since a second pattern was drawn, that a predetermined time has passed since the vehicle started moving, or that the vehicle speed has become no lower than a predetermined value.

Changing the pattern drawn on the road surface 900 from the first pattern PTN_1 to the second pattern PTN_2 can let nearby pedestrians or drivers of other vehicles find out promptly that the vehicle 906 has started moving or will start moving, and such pedestrians or drivers can take evasive action without delay. Moreover, since the first pattern PTN_1 is drawn prior to the second pattern PTN_2, pedestrians or the like can find out in advance that the vehicle may start moving and can thus take action accordingly.

Embodiment 2 has been described above. Now, some variations of Embodiment 2 will be described.

Variation 2-1

Figure 9A:
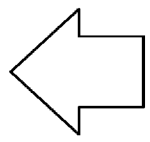
FIGS. 9A to 9E illustrate some second patterns according to a variation.
Figure 9B:
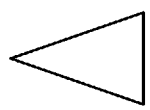
Figure 9C:
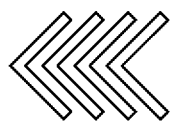
Figure 9D:
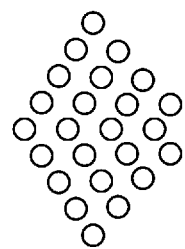
Figure 9E:

FIGS. 9A to 9E illustrate some second patterns PTN_2 according to a variation. A figure forming a second pattern PTN_2 is not limited to a rectangle. For example, a figure forming a second pattern PTN_2 may be an arrow, as illustrated in FIG. 9A, or a triangle, as illustrated in FIG. 9B. Moreover, a second pattern PTN_2 may be formed by a plurality of figures. For example, a second pattern PTN_2 may include a plurality of figures of an inverted V shape, as illustrated in FIG. 9C, or include a plurality of dot figures arranged in an inverted V pattern, as illustrated in FIG. 9D. Moreover, a second pattern PTN_2 may include a character. For example, a second pattern PTN_2 may include characters indicating that the vehicle will start moving, as illustrated in FIG. 9E.

A figure forming a first pattern PTN_1 is not limited to a rectangle, either. As with a second pattern PTN_2, a figure forming a first pattern PTN_1 may be an arrow or a triangle or include a plurality of figures or a character.

Variation 2-2

A vehicle to which the lamp system 100 is mounted may be a vehicle capable of autonomous driving. During autonomous driving as well, a first pattern PTN_1 and a second pattern PTN_2 may be drawn similarly as in the case of manual driving. The present variation can provide advantageous effects similar to those provided by Embodiment 2. Moreover, the present variation can let pedestrians or the like know that an autonomously driving vehicle is looking out to its surroundings, and this can make the pedestrians or the like feel safe.

Variation 2-3

According to Embodiment 2, the light distribution variable lamp 110 is a light source additional to the low beam 102 and the high beam 104. Alternatively, the function of at least one of the low beam 102 or the high beam 104 may be integrated with the light distribution variable lamp 110.

The present invention has been described based on embodiments with use of specific terms, but the embodiments merely illustrate the principle and one aspect of an application of the present invention, and a number of modifications or changes in the arrangement can be made to the embodiments within a scope that does not depart from the spirit of the present invention set forth in the claims.

What is claimed is:
1. A lamp system, comprising:
a road surface drawing lamp that illuminates a road surface with a beam; and
a lamp controlling unit that controls the road surface drawing lamp and draws, with the beam, a pattern on the road surface ahead of a vehicle, wherein the lamp controlling unit draws a first pattern before a start of a predetermined event determined to occur and draws a second pattern at the start of the event, the first pattern including first information to be presented in advance to a driver to allow the driver to respond to the event, the second pattern including second information corresponding to the event, wherein the predetermined event is narrowing of a road ahead, the first information is an instruction to slow down, and the second information is a width of the vehicle.

2. A lamp system, comprising:

a road surface drawing lamp that illuminates a road surface with a beam; and a lamp controlling unit that controls the road surface drawing lamp and draws, with the beam, a pattern on the road surface ahead of a vehicle, wherein the lamp controlling unit draws a first pattern before a start of a predetermined event determined to occur and draws a second pattern at the start of the event, the first pattern including first information to be presented in advance to a driver to allow the driver to respond to the event, the second pattern including second information corresponding to the event, wherein the predetermined event is a change in a traveling direction, the first information is an instruction to slow down, and the second information is an instruction to change the traveling direction.

* * * * *